US012681725B2

(12) United States Patent
Choudhury et al.

(10) Patent No.: US 12,681,725 B2
(45) Date of Patent: Jul. 14, 2026

(54) OPERAND SELECTION CIRCUITRY

(71) Applicant: Apple Inc., Cupertino, CA (US)

(72) Inventors: Anurag Choudhury, Austin, TX (US); Evan R. Lissoos, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/818,134

(22) Filed: Aug. 28, 2024

(65) Prior Publication Data

US 2025/0110734 A1 Apr. 3, 2025

Related U.S. Application Data

(60) Provisional application No. 63/586,560, filed on Sep. 29, 2023.

(51) Int. Cl.
*G06F 9/30* (2018.01)
*G06F 9/38* (2018.01)

(52) U.S. Cl.
CPC ........ *G06F 9/30032* (2013.01); *G06F 9/3887* (2013.01)

(58) Field of Classification Search
CPC . G06F 9/30032; G06F 9/3887; G06F 9/30036
See application file for complete search history.

(56) References Cited

U.S. PATENT DOCUMENTS 9,292,298 B2 3/2016 Lutz et al.
9,652,231 B2 5/2017 Eichenberger
10,296,556 B2 5/2019 Zhou
10,503,515 B2 12/2019 Pechanek
11,294,672 B2 * 4/2022 Kenney ................... G06F 9/542
11,507,846 B2 11/2022 Keller et al.
11,645,084 B2 * 5/2023 Burns ................. G06F 9/30098
345/506
2006/0227966 A1 * 10/2006 Knowles ............ G06F 9/30036
712/E9.034
2020/0233726 A1 * 7/2020 Dejanovic ............. G06F 9/3828
2021/0055931 A1 * 2/2021 Kenney ................. G06F 9/3887
2022/0261637 A1 8/2022 Liu et al.
2023/0229588 A1 7/2023 Aggarwal et al.

* cited by examiner

*Primary Examiner* — Corey S Faherty

(74) *Attorney, Agent, or Firm* — Kowert, Hood, Munyon, Rankin & Goetzel, P.C.; Gentry C. McLean; Dean M. Munyon

(57) ABSTRACT

Techniques are disclosed involving selection circuitry for stored operands. An embodiment of an apparatus includes a random-access storage element array and a permute network. The storage element array is configured to store a set of input data to an operation in a set of entries allocated among one or more execution lanes. The permute network is connected to each entry of the set of entries and is configured to select from among the set of entries to provide operands to one or more source inputs of execution circuitry configured to perform the operation. For a given source input, the permute network provides connection to only a subset of the entries that are allocated to a given execution lane. In a further embodiment, the permute network is configured to support multiple modes of the operation.

20 Claims, 12 Drawing Sheets

Matrix A

| Lane 0 Src0, Src1 | | Lane 1 Src0, Src1 | |
|---|---|---|---|
| A00 | A01 | A20 | A21 |
| A02 | A03 | A22 | A23 |
| A10 | A11 | A30 | A31 |
| A12 | A13 | A32 | A33 |

FIG. 7A

Matrix A, transposed

| Lane 0 Src0, Src1 | | Lane 1 Src0, Src1 | |
|---|---|---|---|
| A00 | A10 | A02 | A12 |
| A20 | A30 | A22 | A32 |
| A01 | A11 | A03 | A13 |
| A21 | A31 | A23 | A33 |

FIG. 7B

800

Storing, into a set of entries of a storage array of a processor, a set of input data to an operation, where the set of entries is allocated among one or more execution lanes

810

Connecting to each entry of the set of entries and to one or more source inputs of execution circuitry configured to perform the operation, where the connecting includes providing, for a given source input, connection to only a subset of the entries that are allocated to a given execution lane

900

Storing, into a set of entries of a storage array of a processor, a set of input data to an operation having multiple modes

910

Using a permute network connected to each entry of the set of entries, selecting from among the set of entries to provide operands to one or more source inputs of execution circuitry configured to perform the operation

920

Using a mode-balanced stage of the permute network, reducing, by a similar proportion for each of the multiple modes, a number of connections extending beyond the mode-balanced stage and toward the one or more source inputs

OPERAND SELECTION CIRCUITRY

CROSS-REFERENCE TO RELATED APPLICATIONS

This application claims priority to U.S. Provisional App. No. 63/586,560 entitled "Operand Selection Circuitry," filed Sep. 29, 2023, the disclosure of which is hereby incorporated by reference herein in its entirety.

BACKGROUND

Technical Field

This disclosure relates generally to computer processors and more particularly to circuitry for operand selection in processors.

Description of the Related Art

Data processing circuitry may include data networks in which data is passed through multiple cascaded stages. For example, many processors execute instructions using single instruction, multiple data (SIMD) or single instruction, multiple thread (SIMT) architectures, in which a given operation is specified for a set of multiple threads that perform the operation on potentially different data. Processing of a large array or image may involve use of a permute network selecting different operands in turn. A permute network generally provides connections to route operands stored in multiple entries of a random-access storage element array to appropriate source inputs of execution circuitry. In order to provide the needed connections, a permute network may, at its first stage adjacent to the storage array, provide multiple connections to some or all of the entries storing operands, creating a "fanout" requiring a widened data bus for that part of the network. When operands are stored in a typical random-access memory (RAM) having built-in read ports, the permute network either includes or connects to the read ports.

BRIEF DESCRIPTION OF THE DRAWINGS

FIG. 7A is a diagram illustrating an example sequence of operands for a matrix multiplication operation, according to some embodiments.

FIG. 7B is a diagram illustrating an example sequence of operands for multiplication of a transposed matrix, according to some embodiments.

FIG. 8 is a flow diagram illustrating an example method of selecting operands for execution circuitry, according to some embodiments.

FIG. 9 is a flow diagram illustrating an example method of selecting operands for multiple modes of operation, according to some embodiments.

DETAILED DESCRIPTION

Figure 1:
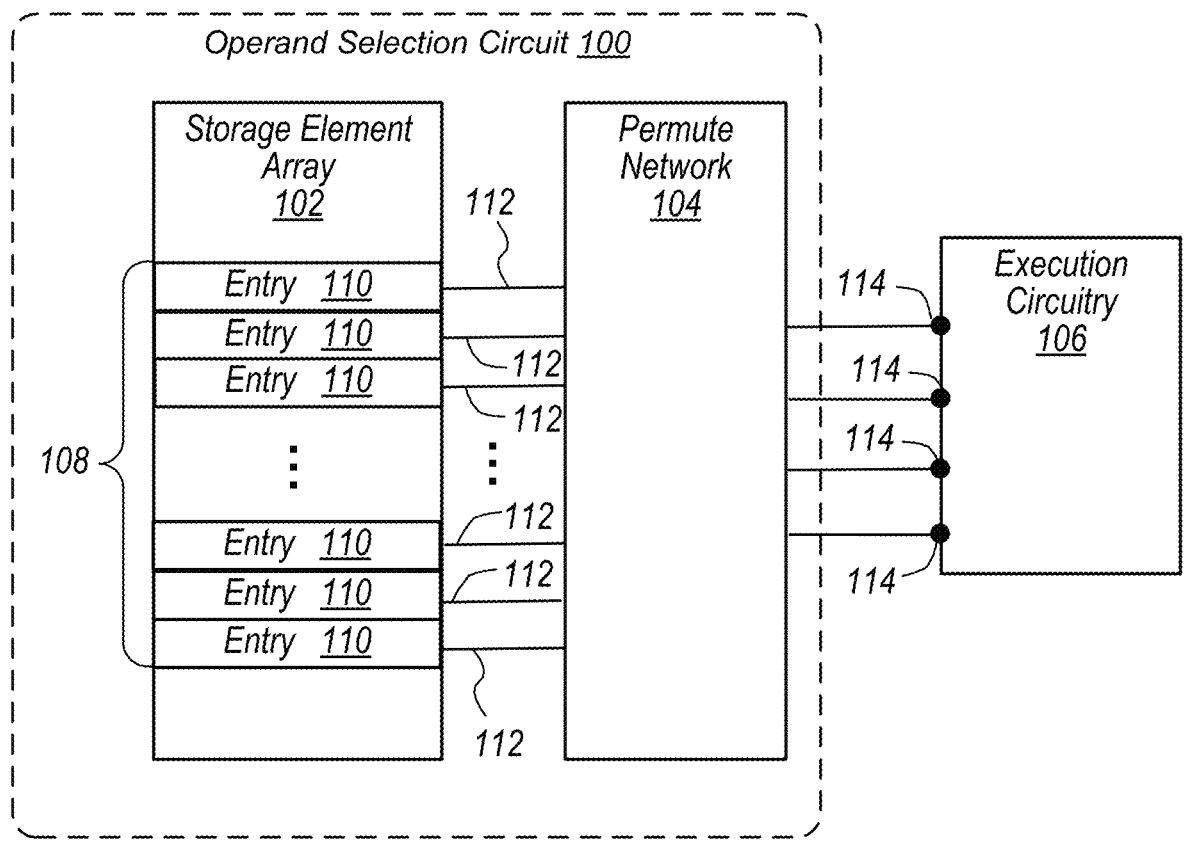
FIG. 1 is a block diagram illustrating example elements of an operand selection circuit, according to some embodiments.

As mentioned above, many processors include permute networks for selecting among operands. For SIMD operations, operands are often stored in entries of a RAM having built-in read ports, where each read port connects to each of the entries that are allocated to a given execution lane and selects one of the stored operands to output. The number of read ports needed for a given lane may therefore be driven by the number of sources needed by the execution circuitry. Use of standard read ports can therefore lead to significant fanout of connections needed to feed the read ports. A read port selecting from 4, 8, or larger numbers of inputs can be viewed as a multi-stage multiplexer. Reduction of the bus width needed to support the connections provided by the read port occurs at each of the multiple stages. Depending on the number of read ports needed, it may take multiple stages of multiplexing for the number of connections needed to be reduced back to the original number of entries in the lane.

Additional permute network complexity can result when an operation being carried out involves multiple modes. For example, supplying operands to a matrix multiplication operation can be considered to have two modes: supplying a non-transposed matrix and supplying the transpose of the matrix. The connectivity needed by different modes can be quite different, such that the connectivity and reduction stages provided by standard read porting, if beneficial to one mode, are likely not beneficial to another mode. Additional layers of multiplexing beyond the built-in read porting may therefore be needed to support multiple modes of operation. In general, use of standard read ports may cause a permute network to have buses wider than necessary in some parts of the network, leading to additional layout complexity and expense. The need for additional multiplexing to support some operating modes can further increase complexity and expense of the permute network.

The present disclosure describes techniques for implementing an operand selection circuit that does not include standard read ports. A permute network of the operand selection circuit may be considered "integrated" with a memory such as a cache because it connects directly to entries of the memory rather than connecting through a read port. The permute network connects to each entry in a set of entries storing the data being used to perform an operation, where the set of entries is allocated among one or more execution lanes. Unlike a set of read ports, the permute network does not implement "crossbar" connection of every entry in a given lane to a source input of the execution circuitry. When multiple modes of operation are carried out, the permute network includes connectivity that supports the modes of operation. In an embodiment, the permute network is configured to balance the connectivity needs of different modes, allowing the permute network's bus widths to be narrowed at an earlier stage in the network as compared to a network including standard read ports. In a further embodiment, the permute network includes one or more stages, with at least one stage configured to reduce, by a similar amount for each mode, the bus width needed to support that mode. Embodiments of operand selection circuits as disclosed herein are illustrated in, for example, FIGS. 1, 2, 5 and 6.

FIG. 1 illustrates example elements of an operand selection circuit 100. As shown, circuit 100 includes a storage element array 102 coupled to a permute network 104. In an embodiment, storage element array 102 is a random-access storage element array and does not include built-in read ports. In various embodiments, array 102 may include a latch array or a flip-flop array. Array 102 may be implemented as at least a portion of a cache memory in some embodiments. Storage element array 102 includes a set 108 of entries 110. In an embodiment, each entry 110 is configured to store an operand for use by execution circuitry 106 to perform an operation. In various embodiments, entries in set 108 are allocated among one or more execution lanes.

Permute network 104 is connected via connections 112 to each of the entries within set 108. As shown, permute network 104 is also connected to source inputs 114 of execution circuitry 106. In an embodiment permute network 104 is configured to select from among entries within set 108 to provide operands to source inputs 114. In a further embodiment, permute network 104 provides, for a given source input 114, connection to only a subset of the entries within set 108. In various embodiments, permute network 104 provides, for a given source input 114, connection to only a subset of the entries 110 that are allocated to a given execution lane, or only a subset of the entries 110 that would be accessed using a built-in read port.

Figure 2:
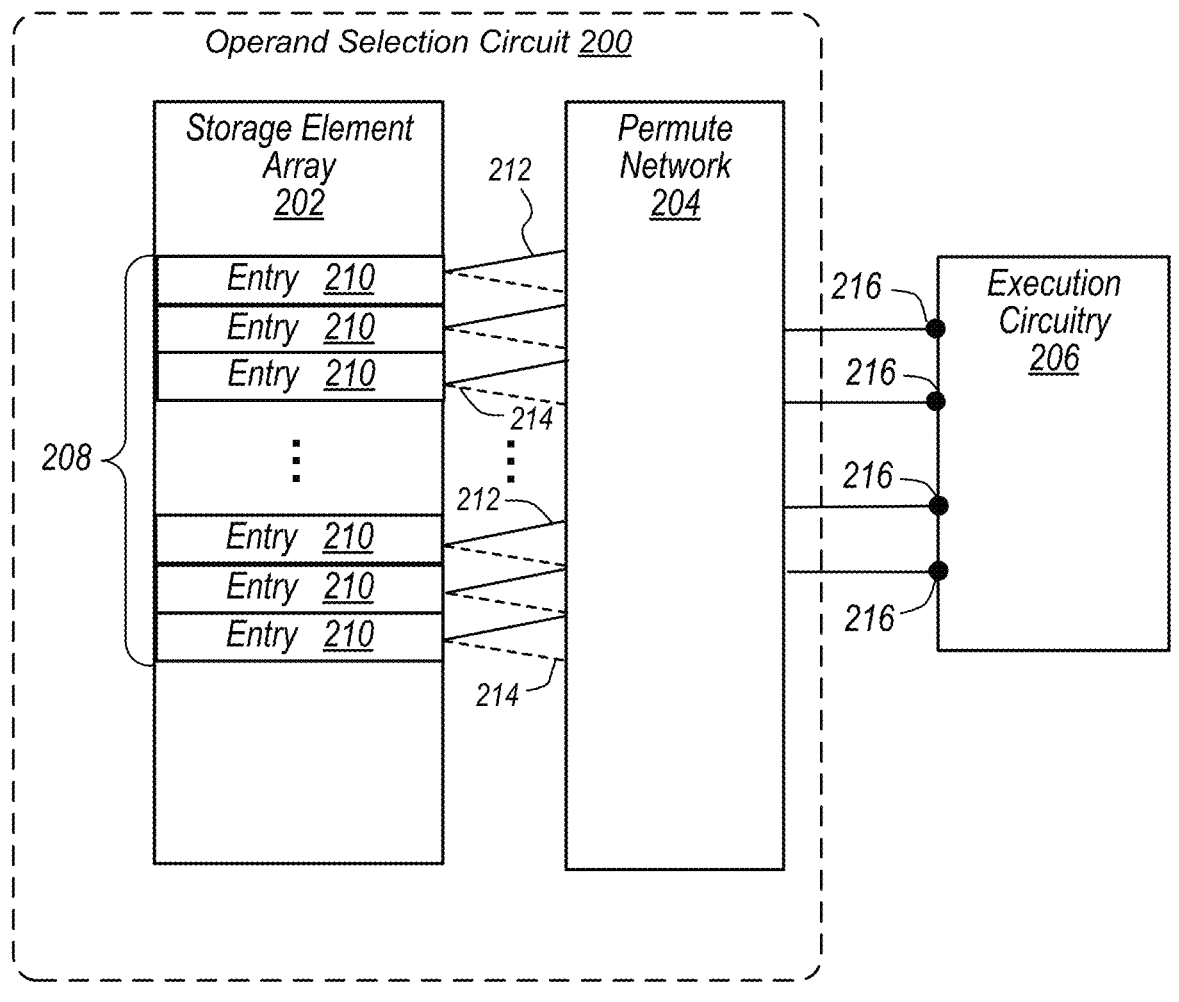
FIG. 2 is a block diagram illustrating example elements of an operand selection circuit supporting multiple modes of operation, according to some embodiments.

FIG. 2 illustrates example elements of an operand selection circuit 200. As shown, circuit 200 includes a storage element array 202 coupled to a permute network 204. Permute network 204 is connected to source inputs 216 of execution circuitry 206. Operand selection circuit 200 is similar to operand selection circuit 100 of FIG. 1 except that permute network 204 has two connections to each of entries 210 in set 208. In an embodiment, connections 212 correspond to a first mode of operation and connections 214 correspond to a second mode of operation. In other embodiments of an operand selection circuit, a permute network may not have separate connections for each mode to each entry. In some cases, for example, a single connection to an entry is sufficient to support connections for multiple modes. As another example, in some cases certain entries may contain operands that are used for fewer than all of the modes of operation.

Figure 3:
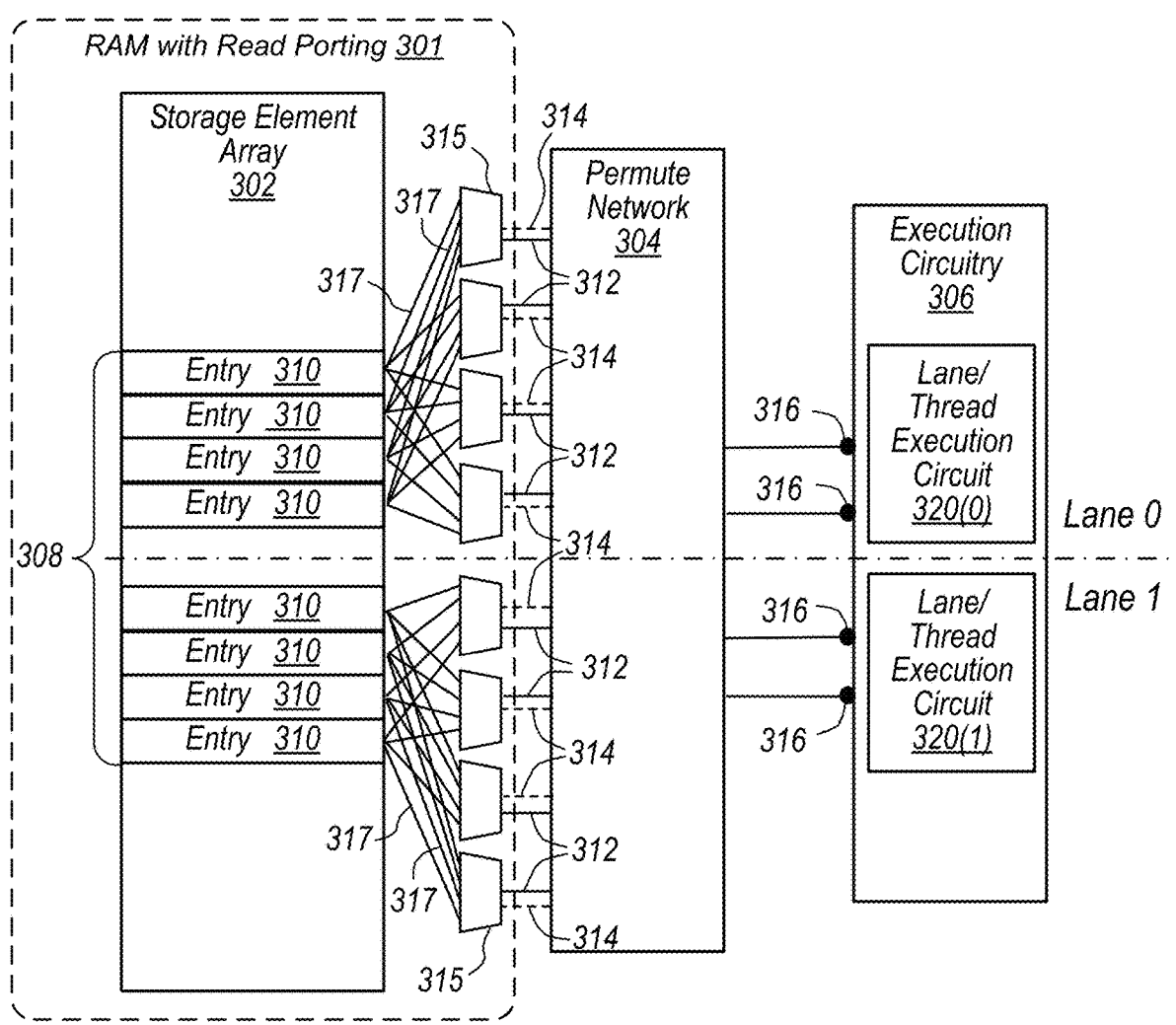
FIG. 3 is a block diagram illustrating example elements of operand selection circuitry using a RAM having read ports, according to some embodiments.

FIG. 3 illustrates example elements of an operand selection scenario using a RAM with built-in read ports. RAM 301 includes a storage element array 302 and multiple read ports 315. Storage element array 302 includes a set 308 of entries 310. In the embodiment of FIG. 3, the entries in storage element array 302 are allocated among two lanes, as indicated by a dot-dashed line. In some embodiments of lanes as used in this disclosure, each lane is allocated for execution of a corresponding program thread. In other embodiments, the numbers of lanes and threads may be different. For example, in some embodiments there are more threads than lanes and a given lane is used for execution of multiple threads. As shown in FIG. 3, each of lanes 0 and 1 has a corresponding execution circuit, and each of the read ports is connected to every entry within its lane for a given thread.

In an embodiment, storage element array 302 is similar to storage element arrays 102 and 202 of FIGS. 1 and 2, except that storage element array 302 is coupled to read ports 315 and has entries allocated to execution lanes 1 and 2. As shown in FIG. 3, each of entries 310 allocated to a given lane is connected by connections 317 to four read ports 315 allocated to the lane. Permute network 304 is connected via connections 312 and 314 to outputs of read ports 315. In a similar way as shown for FIG. 2, the scenario of FIG. 3 includes connections supporting two different modes of operation using execution circuitry 306. Connections 312 correspond to a first mode of operation, while connections 314 correspond to a second mode of operation. Connections 312 and 314 are shown to convey that in various embodiments, each of read ports 315 may be allocated for use in the first mode of operation, the second mode of operation, or both modes. Although connections 312 and 314 are shown as separate lines to illustrate the possible support for either or both modes, read ports 315 may have single output connections in some embodiments, which single output connections may be used for connection in one or both modes of operation. In various embodiments, a number of read ports used by a first mode of operation may be different than a number of read ports used by a second mode of operation. An example of such a mismatch in number of read ports used by a given mode can be seen in the matrix multiplication example described below in connection with FIG. 4.

As shown, permute network 304 is also connected to source inputs 316 of execution circuitry 306. In the embodiment of FIG. 3, two of source inputs 316 are allocated to each of lane/thread execution circuits 320 within execution circuitry 306. Although FIG. 3 illustrates permute network 304 as coupling read ports 315 of RAM 301 to execution circuitry 306, a combination of read ports 315 and permute network 304 can be viewed as a larger permute network coupling storage element array 302 to execution circuitry 306.

In an embodiment, the permute network formed by a combination of read ports 315 and permute network 304 provides, for a given source input 316, connection to all of the entries 310 allocated to the same execution lane. This connectivity may come at a cost, however. As shown, full connection of the four entries 310 to the four read ports 315 allocated to a give lane results in a connection width of 32 lines at the widest point along the operand path for the eight entries in set 308. On the other hand, connection directly to the same number of entries 210 as shown in FIG. 2 would result in a connection width of 16 lines for eight entries. If permute network 204 of FIG. 2 can be designed to provide the connections needed for the two modes of operation supported, the reduced maximum connection width may allow a reduction in the integrated circuit area needed to implement the processor performing the operation.

In addition to requiring a large maximum connection width, the read port connectivity in the scenario of FIG. 3 may also have a cost in active device count and the associated power and circuit area requirements. In the embodiment of FIG. 3, each of read ports 315 performs a 4-to-1 multiplexing function. As a rule of thumb for comparison purposes, we can consider multiplexers as formed from combinations of 2-to-1 multiplexers. For example, the 4-to-1 multiplexing of one of read ports 315 can be considered as formed from a combination of three 2-to-1 multiplexers.

Two of the multiplexers form a first stage of the read port, each receiving two of the four inputs to the read port and selecting one of them. The third multiplexer selects between the two outputs of the first-stage multiplexers to provide a single output signal. Based on this model, the eight read ports 315 are equivalent to 24 2-to-1 multiplexers. This 24 multiplexers plus the number of 2-to-1 multiplexers needed to implement permute network 304 is the equivalent number of multiplexers between storage element array 302 and execution circuitry 306. If permute network 204 of FIG. 2 can be designed to provide the connections needed for the two modes of operation supported while using the equivalent of fewer multiplexers than 24 plus the number of equivalent multiplexers in permute network 304, additional savings in power consumption and integrated circuit area may be realized.

Figure 4:
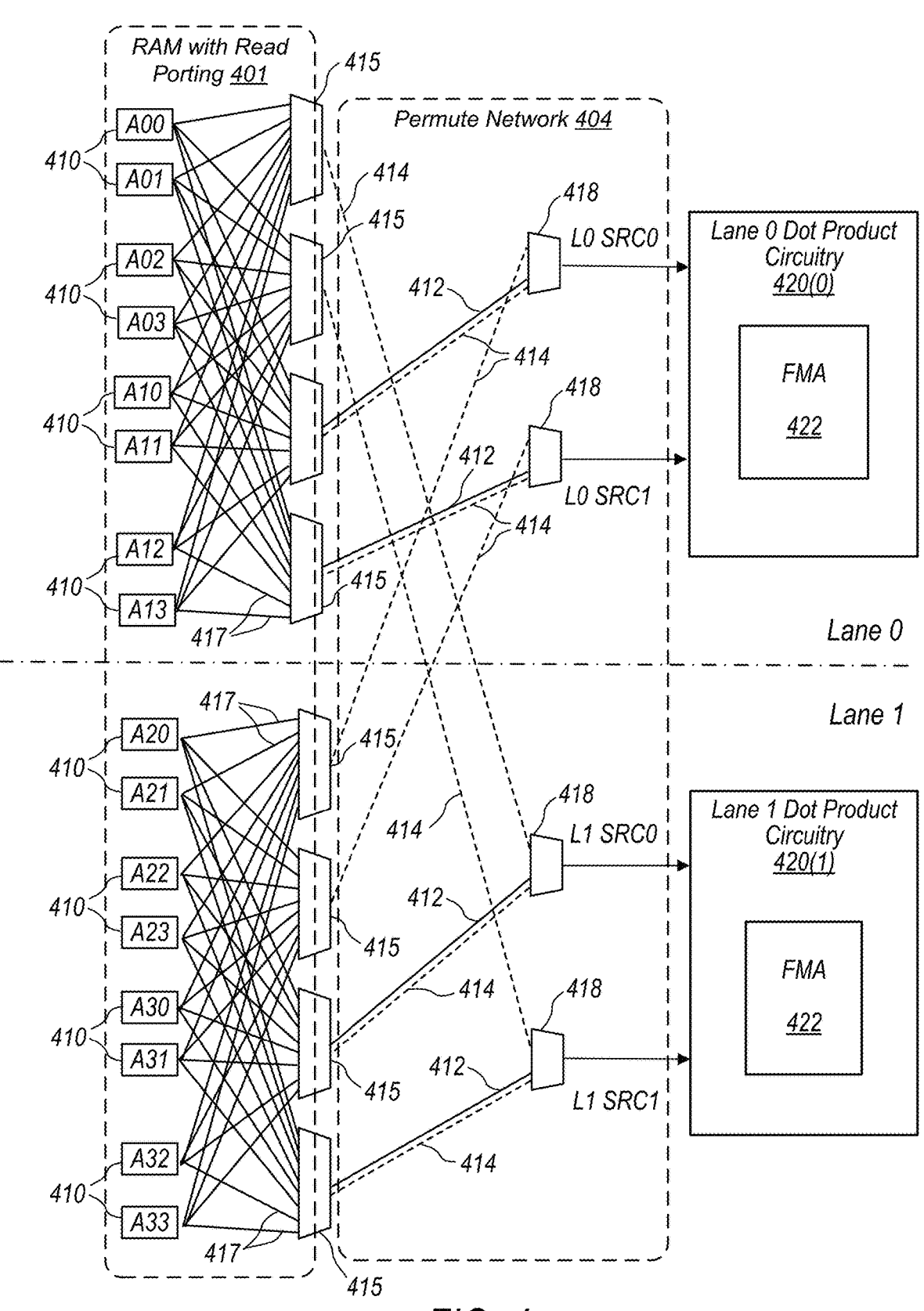
FIG. 4 is a block diagram illustrating example elements of operand selection circuitry for a matrix multiplication operation when using a RAM having read ports, according to some embodiments.

FIG. 4 illustrates example elements of an operand selection scenario using a RAM with built-in read ports applied to a particular matrix multiplication example. In the embodiment of FIG. 4, entries 410 of RAM 401 store elements A00 through A33 of a 4×4 matrix A. The elements are allocated between execution lanes 0 and 1, each of which has dot product circuitry 420 receiving two source inputs, SRC0 and SRC1, from the A matrix for each lane. Dot product circuitry 420 includes fused multiply-add (FMA) circuitry 422. Permute network 404 includes multiplexing that connects operands for both non-transposed (solid-line connections 412) and transposed (dashed-line connections 414) modes of operation. Although shown as separate lines in FIG. 4, connections between a given read port and the same multiplexer 418 are in various embodiments implemented using a single physical connection (similar to connections shown using long- and short-dashed lines in the circuit of FIG. 6).

In the illustrated embodiment, outputs from two of the four read ports 415 in each lane are used only in the transposed mode of operation, while outputs of the other two read ports in each lane are used in both the non-transposed and transposed modes. As a result, an additional layer of multiplexers 418 is needed to reduce the number of inputs to circuitry 420 in the case of the transposed mode, but these multiplexers are not actually needed in the case of the non-transposed mode (read port outputs in the non-transposed mode are simply passed through multiplexers 418). In the case of this matrix multiplication example, the matrix elements are arranged in entries 410 in a way that is efficient for the non-transposed mode but inefficient for the non-transposed mode. This imbalance between the modes in the number of selection stages needed forces a permute network using read ports to incorporate extra connections and circuitry that are not needed by one of the modes. Similar imbalances between selection circuitry needed by different modes of operation are believed to occur in applications other than matrix multiplication, as well.

In addition to a storage array with entries 410, RAM 401 includes built-in read ports 415. In the embodiment of FIG. 4, each of the four read ports 415 allocated to a lane is connected to each of the eight entries allocated to that lane via connections 417. The arrangement of FIG. 4 requires a connection width of 64 connections between entries 410 and read ports 415. Each source entry for each lane is connected, via a multiplexer 418, to the output of one of read ports 415 within its lane for non-transposed operation and to the output of a read port 415 in either its own lane or the adjacent lane for transposed operation. As such, permute network 404 in combination with read ports 415 provides to a given source input for the execution circuitry connection to all entries allocated to the same lane as the given source input. In the embodiment of FIG. 4, connection is also provided to all entries in the adjacent lane of a given source input, through some of the connections for the transposed mode of operation.

It is noted that FIG. 4 and other drawings presented herein provide a simplified view of one example of an operand selection scenario for illustration purposes. For example, FIG. 4 shows only the "A matrix" operand selection for a matrix multiplication operation. In various embodiments, another set of entries storing B matrix elements is connected using a similar permute network to provide corresponding B matrix elements to dot product circuitry 420. Read ports and multiplexers of the various operand selection circuitry embodiments disclosed herein are controlled by the processor carrying out the operation performed using the execution circuitry, using control circuitry not shown. Similar operand selection scenarios may be used for matrices having different sizes. In various embodiments, the stored matrix elements are multibit values and the connections, ports and multiplexers shown are configured to carry and forward such multibit values. Although the example of FIG. 4 involves a permute network for execution using multiple execution lanes, other embodiments may involve a storage array storing entries that are selected by a permute network for a single execution circuit receiving multiple input operands in a given cycle. The specific data structures and operations disclosed herein are included for purposes of illustration but are not intended to limit the scope of the present disclosure.

Figure 5:
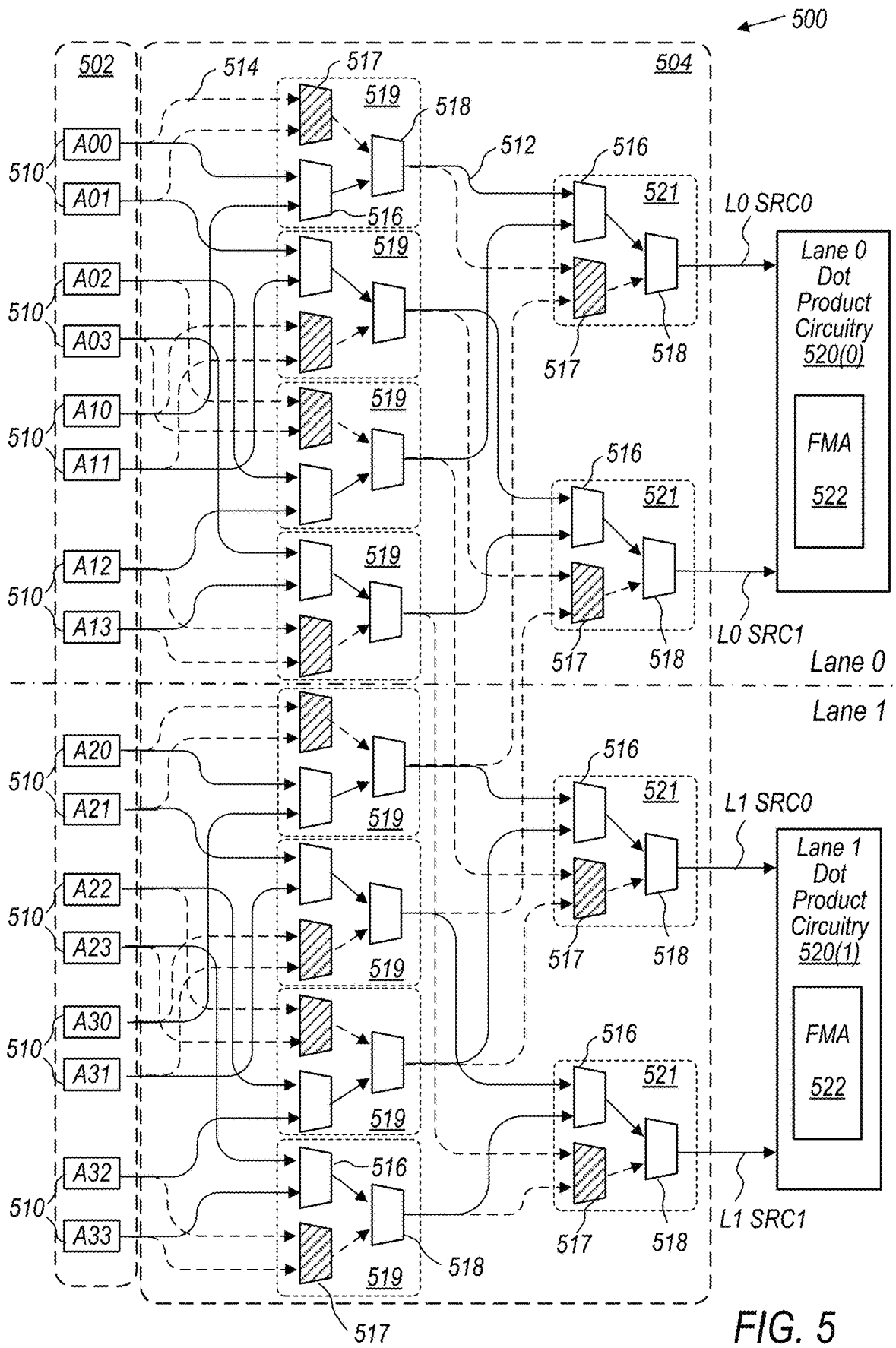
FIG. 5 is a block diagram illustrating example elements of an operand selection circuit for matrix multiplication, according to some embodiments.

FIG. 5 illustrates example elements of an operand selection circuit 500 for implementing the same matrix multiplication operation illustrated in FIG. 4, but using a custom permute network 504 and a storage element array 502 not having built-in read ports. While using the matrix element data and lane configuration of FIG. 4, operand selection circuit 500 takes an approach like that of operand selection circuit 200 of FIG. 2, which does not use read ports, and in which each entry has two connections into the permute network, one for each of the two modes of operation supported. As shown, circuit 500 includes a storage element array 502 coupled to a permute network 504. Permute network 504 is connected to source inputs SRC0 and SRC1 of dot product circuitry 520 for each of lanes 0 and 1. Storage element array 502 is similar to storage element arrays 102 and 202 and includes entries 510 storing elements A00 through A33 of a 4×4 matrix A.

As shown in FIG. 5, each of entries 510 has two connections into permute network 504, one for a non-transposed mode of operation and one for a transposed mode. Connections 512, shown in solid lines, are connections for the non-transposed mode and connections 514, shown in dashed lines, are for the transposed mode. A first stage of permute network 504 is illustrated as a set of eight 4-to-1 multiplexers 519, where each multiplexer 519 includes three 2-to-1 multiplexers 516, 517 and 518. These three multiplexers have the same operation but vary in the type of inputs they receive. Multiplexer 516 receives two non-transposed mode inputs and selects between them. Multiplexer 517, shown shaded, receives two transposed mode inputs and selects between them. Multiplexer 518 receives one non-transposed mode input and one transposed mode input.

It can be seen that this first stage of the permute network includes eight of multiplexers 516 that reduce the number of non-transposed mode connections and eight of multiplexers 517 that reduce the number of transposed mode connections. As such, the stage of permute network 504 including multiplexers 519 is a mode-balanced stage that reduces a number of connections continuing through the network by a similar proportion (in this case by the same proportion) for both modes of operation. The next stage of permute network 504 includes a set of four 4-to-1 multiplexers 521, where multiplexers 521 include the same three 2-to-1 multiplexers as multiplexers 519. This second stage of permute network 504 includes four each of multiplexers 516 that reduce the number of non-transposed mode connections and of multiplexers 517 that reduce the number of transposed mode connections. As such, the stage including multiplexers 521 is also a mode-balanced stage. In various embodiments, use of mode-balanced stages that reduce the number of connections by the same or similar proportions for all supported modes of operation may allow connection widths in the network to be reduced at a shorter distance into the network. If connections for the different modes of operation are not reduced in a balanced way, extra connections and multiplexers may have to be maintained farther into the network for some modes even when not needed for other modes.

As shown in FIG. 5, the maximum connection width of operand selection circuit 500 is 32 connections, two for each of entries 510. The number of 2-to-1 multiplexers in permute network 504 is 36. By contrast, the read-port-based operand selection scheme of FIG. 4 has a maximum connection width of 64 connections and an effective number of 2-to-1 multiplexers of 60 (where each 8-to-1 read port is counted as a combination of seven 2-to-1 multiplexers). Unlike the read-port-based selection circuitry of FIG. 4, operand selection circuit 500 does not provide connection of all of the entries allocated to a lane to a given source input to the execution circuit for that lane. For a given source input, permute network 504 provides connection to only a subset of the entries that are allocated to a given execution lane. For example, it can be seen from FIG. 5 that the SRC0 input of lane 0 is not connected to the entries containing elements A03, A11 and A13. Similarly, the SRC1 input of lane 0 is not connected to the entries containing elements A00, A02 and A12, the SRC0 input of lane 1 is not connected to the entries containing elements A21, A31 and A33, and the SRC1 input of lane 1 is not connected to the entries containing elements A20, A22 and A30.

A permute network such as that of FIG. 5 may in some cases be advantageously described and/or designed using various indices to characterize matrix elements and clock cycles. Table 1 illustrates an example of relationships that may be used to characterize a multiplication operation for the 4×4 matrix A of FIGS. 4 and 5.

TABLE 1

| $t_0$ | $u_3$ | $u_2$ | $u_0$ |
|---|---|---|---|
| $L_0$ | $G_2$ | $G_1$ | $G_0$ |
| $R_1$ | $R_0$ | $C_1$ | $C_0$ |

In Table 1, $R_1$ and $R_0$ are upper and lower digits of a binary representation of the row number of an element in matrix A. $C_1$ and $C_0$ are upper and lower digits of a binary representation of the column number of an element in matrix A. $L_0$ is the lower digit of a binary representation of the lane number for an element of the matrix. $G_2$, $G_1$ and $G_0$ are digits of a binary representation of an element number, within a given lane, of a matrix element. A matrix element can be uniquely addressed using either a combination of its R and C values or a combination of its L and G values. The correspondence shown in Table 1 between the index pairs $G_0$ and $C_0$, $G_1$ and $C_1$, $G_2$ and $R_0$ and $L_0$ and $R_1$ reflects the way the matrix elements are allocated to lanes in this example, with elements taken from along successive rows of the matrix. Index to is the lower digit of a thread number for an element of the matrix. For the example illustrated in FIGS. 4 and 5, thread number and lane number are the same, but this is not necessarily the case in other embodiments. The $u_3$, $u_2$, and $u_0$ indices are digits of a binary representation of a given clock cycle number (or micro-op number) during operation execution. For the example of FIGS. 4 and 5, multiplication of matrix A by a 4×4 matrix B can be done in 16 clock cycles. The ordering of the u indices chosen relates to whether inner products or outer products are used in the matrix multiplication operation.

Table 2 illustrates how the various elements of non-transposed (N) and transposed (T) A and B matrices are used during a matrix multiplication operation. The appearance of a given u index digit in a column of Table 2 corresponding to a given row or column index, for example, gives an indication of how often, in terms of cycles, that row or column index value changes during the multiplication operation. The * character represents a "collect" or wildcard value indicating that both values of the index will appear. The source information of Table 2 can be used to arrive at the permute network connections shown in FIG. 5.

TABLE 2

| | $R_1$ | $R_0$ | $C_1$ | $C_0$ |
| | $L_0$ | $G_2$ | $G_1$ | $G_0$ |
|---|---|---|---|---|
| AN | $t_0$ | $u_3$ | $u_1$ | * |
| BN | $u_1$ | * | $u_2$ | $u_0$ |
| AT | $u_1$ | * | $t_0$ | $u_3$ |
| BT | $u_2$ | $u_0$ | $u_1$ | * |

The example illustrated in FIG. 5, Table 1 and Table 2 represents a single example for illustration purposes. Like FIG. 4, FIG. 5 illustrates only the "A matrix" operand selection for a matrix multiplication operation. In various embodiments, techniques described herein may be applied to, for example, other matrix sizes for matrix multiplication operations, operations other than matrix multiplication, or permute networks supporting more than two modes of operation.

Figure 6:
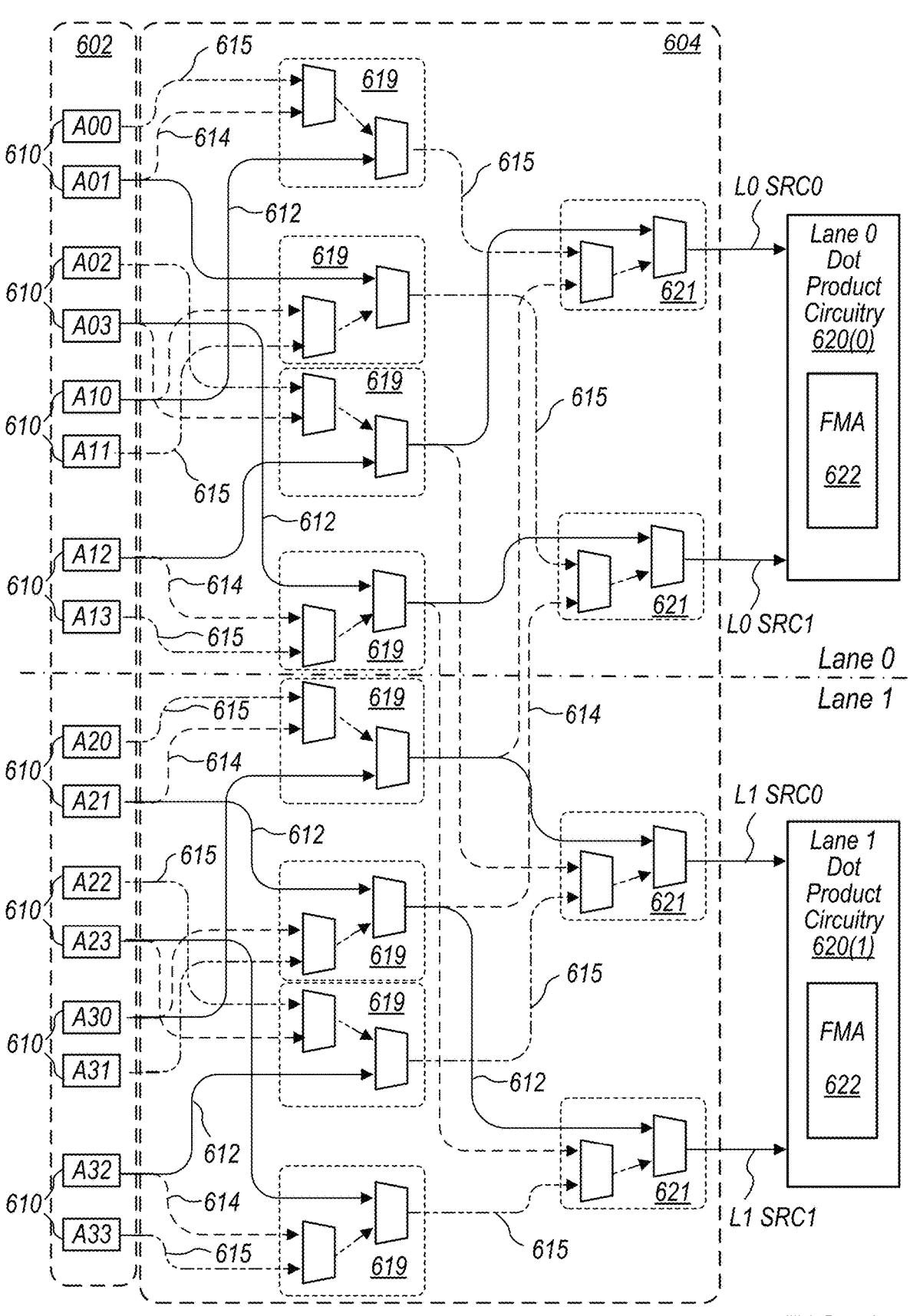
FIG. 6 is a block diagram illustrating an optimization that reduces the multiplexer count in the operand selection circuit of FIG. 5, according to some embodiments.

FIG. 6 illustrates the example of FIG. 5 with the application of an optimization reducing the multiplexer count in the operand selection circuit. Storage element array 602 of FIG. 6 is similar to storage element array 502 of FIG. 5, and dot product circuitry 620 is similar to dot product circuitry 520 of FIG. 5. Examination of permute network 504 of FIG. 5 shows that some of entries 510 are connected to the same 4-to-1 multiplexer 519 for both the non-transposed and transposed modes of operation. In FIG. 6, the two connections to such entries are replaced by a single connection 615, shown with a long- and short-dashed line. Each of 4-to-1 multiplexers 519 of FIG. 5 can be implemented as a 3-to-1 multiplexer 619 in FIG. 6. Similarly, it can be seen in FIG. 5 that outputs for some of multiplexers 519 go to the same multiplexer 521 for both the non-transposed and transposed modes. These outputs are also changed to single connections 615 in FIG. 6, and 4-to-1 multiplexers 521 of FIG. 5 are implemented as 3-to-1 multiplexers 621 in FIG. 6. The 3-to-1 multiplexers of FIG. 6 perform the same functions as the 4-to-1 multiplexers of FIG. 5, so that the stages formed by multiplexers 619 and by multiplexers 621 are still mode-balanced stages.

The optimization shown in FIG. 6 brings the maximum connection width for this embodiment to 24 connections and the number of 2-to-1 multiplexers to 24. It is noted that optimization can also be applied to the read-port-based operand selection circuitry shown in FIG. 4. For example, instead of a standard RAM having four 8-to-1 read ports per lane, a custom RAM for this matrix multiplication operation could be used in which two of the read ports in each lane have only 2 inputs. This would bring the maximum connection width for the custom RAM implementation to 40 connections and the number of 2-to-1 multiplexers to 36.

FIG. 7A illustrates an example sequence of A matrix operands resulting from the non-transposed mode of the permute network of FIGS. 5 and 6 for the matrix multiplication example shown in those Figures. In an embodiment, each set of operands shown in FIG. 7A would appear at the source inputs of the execution circuitry for four clock cycles. The particular ordering of those cycles would depend on the particular looping sequence chosen for the matrix multiplication. FIG. 7B illustrates an example sequence of A matrix operands resulting from the transposed mode of the permute network of FIGS. 5 and 6 for the matrix multiplication example shown in those Figures.

FIG. 8 illustrates an example method relating to selection of operands for execution circuitry. Method 800 of FIG. 8 illustrates one embodiment of a method performed by a computer processor, such as a processor including the operand selection circuits and execution circuitry of FIG. 1, 2, 5 or 6. In an embodiment, the processor is a graphics processor. Other embodiments of a method may include more or fewer blocks than shown in FIG. 8. Method 800 includes, at block 810, storing a set of input data to an operation into a set of entries of a storage array of the processor. The set of entries is allocated among one or more execution lanes. Examples of sets of entries of a storage array include set 108 of entries 110 of storage element array 102, set 208 of entries 210 of storage element array 202, entries 510 of storage element array 502 and entries 610 of storage element array 602. Allocation of entries into multiple execution lanes having allocated execution circuitry is illustrated in FIGS. 5 and 6, while FIGS. 1 and 2 show connection to execution circuitry of a single execution lane. In some embodiments, the operation is a matrix multiply operation and the set of input data includes values of elements of a matrix. In a further embodiment, storing the set of input data into the set of entries includes storing the values of elements of the matrix in a sequence such that entries storing elements along a first row, or column, of the matrix are followed in the sequence by entries storing elements along a second row, or column, of the matrix, continuing in the same manner until an entirety of the matrix is stored.

Method 800 further includes, in block 820, connecting to each entry of the set of entries and to one or more source inputs of execution circuitry configured to perform the operation. In an embodiment, the connecting is done using a permute network such as permute networks 104, 204, 504 and 604. The connecting includes providing, for a given source input, connection to only a subset of the entries that are allocated to a given execution lane. This reduced connectivity is in contrast to permute networks that include built-in read ports of a RAM, for example. Permute networks 504 and 604 are examples of permute networks providing connectivity for a given source input SRC0 or SRC1 to only a subset of the entries allocated to an execution lane. In an embodiment, the connecting does not include using a read port.

In some embodiments, the connecting of block 820 includes supporting multiple modes of the operation. In an embodiment where the operation is a matrix multiply operation, supported modes may include a non-transposed mode and a transposed mode, for example. In some embodiments supporting multiple modes of operation, the connecting is done using a permute networking having one or more stages, including a mode-balanced stage. In such an embodiment, the connecting may include reducing, by a similar proportion for each of the multiple modes, a number of connections extending beyond the mode-balanced stage and toward the one or more source inputs.

FIG. 9 illustrates an example method relating to selecting operands for multiple modes of operation. Method 900 of FIG. 9 illustrates one embodiment of a method performed by a computer processor, such as a processor including the operand selection circuits and execution circuitry of FIG. 1, 2, 5 or 6. In various embodiments, a processor performing method 900 may be a processor implementing multiple execution lanes, such as those shown in FIGS. 5 and 6, or a processor connecting a storage array to a single execution circuit. In an embodiment, the processor is a graphics processor. Other embodiments of a method may include more or fewer blocks than shown in FIG. 9. Method 900 includes, at block 910, storing a set of input data to an operation having multiple modes into a set of entries of a storage array of a processor. Examples of sets of entries of a storage array include set 108 of entries 110 of storage element array 102, set 208 of entries 210 of storage element array 202, entries 510 of storage element array 502 and entries 610 of storage element array 602. In various embodiments, the storage array may include entries allocated across multiple execution lanes or entries allocated to a single execution circuit. In some embodiments, the operation is a matrix multiply operation and the set of input data includes values of elements of a matrix. In such an embodiment, the multiple modes may include a non-transposed mode and a transposed mode, for example.

Method 900 further includes, in block 920, selecting from among the set of entries to provide operands to one or more source inputs of execution circuitry configured to perform the operation, where the selecting is done using a permute network connected to each entry of the set of entries. Examples of source inputs to execution circuitry include source inputs 114 to execution circuitry 106, source inputs 216 to execution circuitry 206, inputs SRC0 and SRC1 to dot product circuitry 520 in each execution lane of FIG. 5, and inputs SRC0 and SRC1 to dot product circuitry 620 in each execution lane of FIG. 6. Examples of permute networks connected to each entry of the set of entries include permute networks 104, 204, 504 and 604.

Method 900 further includes, in block 930, using a mode-balanced stage of the permute network in reducing, by a similar proportion for each of the multiple modes, a number of connections extending beyond the mode-balanced stage and toward the one or more source inputs. Examples of mode-balanced stages include the stage formed by multiplexers 519 and the stage formed by multiplexers 521 in permute network 504. As shown and described in connection with FIG. 5, these stages reduce by the same proportion the number of connections for the non-transposed mode and the transposed mode of the matrix multiplication example of FIG. 5.

Example Device

Figure 10:
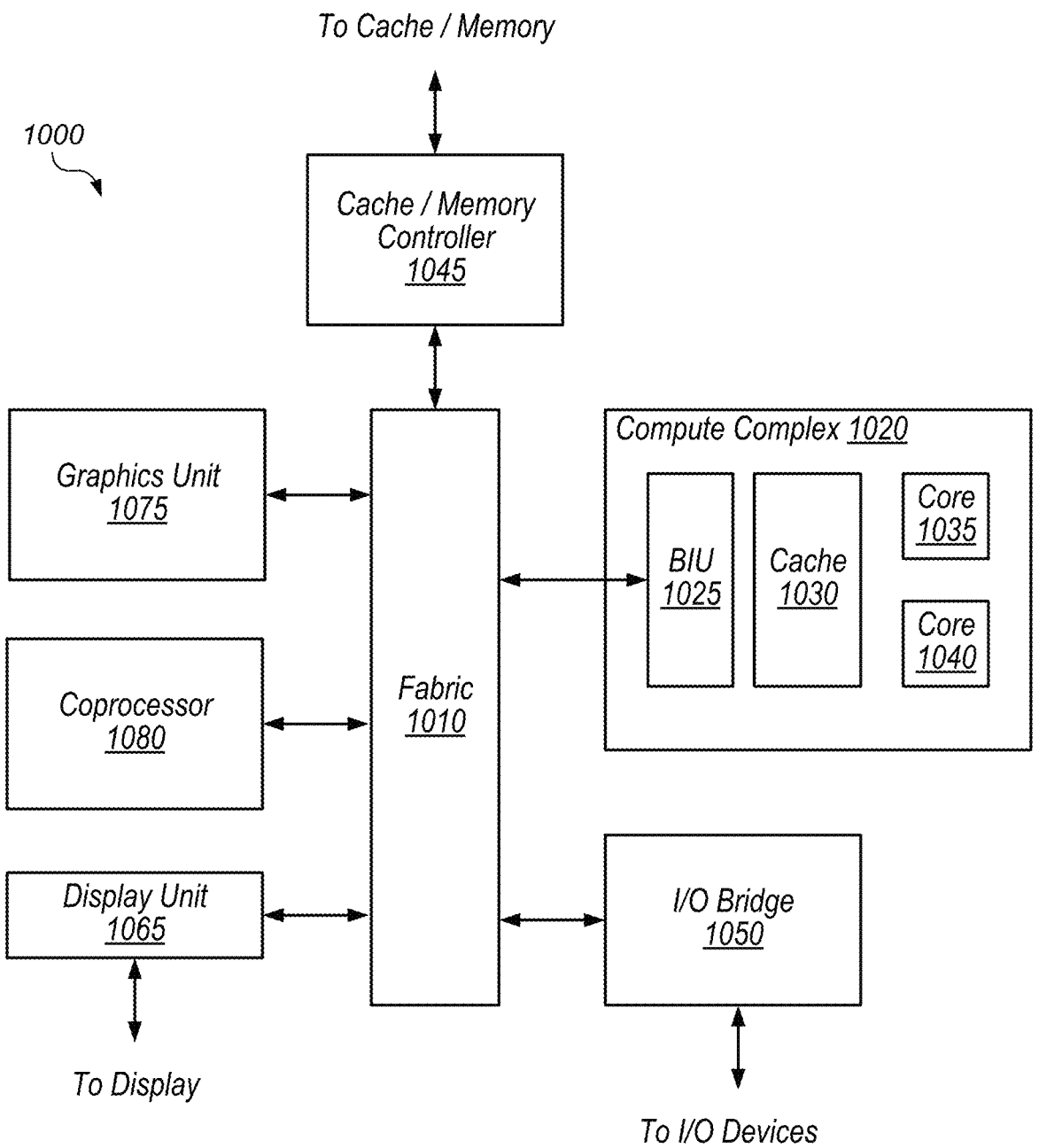
FIG. 10 is a block diagram illustrating example elements of a computing device, according to some embodiments.

Referring now to FIG. 10, a block diagram illustrating an example embodiment of a device 1000 is shown. In some embodiments, elements of device 1000 may be included within a system on a chip. In some embodiments, device 1000 may be included in a mobile device, which may be battery-powered. Therefore, power consumption by device 1000 may be an important design consideration. In the illustrated embodiment, device 1000 includes fabric 1010, compute complex 1020 input/output (I/O) bridge 1050, cache/memory controller 1045, graphics unit 1075, coprocessor 1080 and display unit 1065. In some embodiments, device 1000 may include other components (not shown) in addition to or in place of the illustrated components, such as video processor encoders and decoders, image processing or recognition elements, computer vision elements, etc.

Fabric 1010 may include various interconnects, buses, MUX's, controllers, etc., and may be configured to facilitate communication between various elements of device 1000. In some embodiments, portions of fabric 1010 may be configured to implement various different communication protocols. In other embodiments, fabric 1010 may implement a single communication protocol and elements coupled to fabric 1010 may convert from the single communication protocol to other communication protocols internally.

In the illustrated embodiment, compute complex 1020 includes bus interface unit (BIU) 1025, cache 1030, and cores 1035 and 1040. In various embodiments, compute complex 1020 may include various numbers of processors, processor cores and caches. For example, compute complex 1020 may include 1, 2, or 4 processor cores, or any other suitable number. In one embodiment, cache 1030 is a set associative L2 cache. In some embodiments, cores 1035 and 1040 may include internal instruction and data caches. In some embodiments, a coherency unit (not shown) in fabric 1010, cache 1030, or elsewhere in device 1000 may be configured to maintain coherency between various caches of device 1000. BIU 1025 may be configured to manage communication between compute complex 1020 and other elements of device 1000. Processor cores such as cores 1035 and 1040 may be configured to execute instructions of a particular instruction set architecture (ISA) which may include operating system instructions and user application instructions. These instructions may be stored in computer readable medium such as a memory coupled to memory controller 1045 discussed below.

As used herein, the term "coupled to" may indicate one or more connections between elements, and a coupling may include intervening elements. For example, in FIG. 10, graphics unit 1075 may be described as "coupled to" a memory through fabric 1010 and cache/memory controller 1045. In contrast, in the illustrated embodiment of FIG. 10, graphics unit 1075 is "directly coupled" to fabric 1010 because there are no intervening elements.

Cache/memory controller 1045 may be configured to manage transfer of data between fabric 1010 and one or more caches and memories. For example, cache/memory controller 1045 may be coupled to an L3 cache, which may in turn be coupled to a system memory. In other embodiments, cache/memory controller 1045 may be directly coupled to a memory. In some embodiments, cache/memory controller 1045 may include one or more internal caches. Memory coupled to controller 1045 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 1045 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 1020 to cause the computing device to perform functionality described herein.

Graphics unit 1075 may include one or more processors, e.g., one or more graphics processing units (GPUs). Graphics unit 1075 may receive graphics-oriented instructions, such as OPENGL®, Metal®, or DIRECT3D® instructions, for example. Graphics unit 1075 may execute specialized GPU instructions or perform other operations based on the received graphics-oriented instructions. Graphics unit 1075 may generally be configured to process large blocks of data in parallel and may build images in a frame buffer for output to a display, which may be included in the device or may be a separate device. Graphics unit 1075 may include transform, lighting, triangle, and rendering engines in one or more graphics processing pipelines. Graphics unit 1075 may output pixel information for display images. Graphics unit 1075, in various embodiments, may include programmable shader circuitry which may include highly parallel execution cores configured to execute graphics programs, which may include pixel tasks, vertex tasks, and compute tasks (which may or may not be graphics-related).

One or more coprocessors 1080 may be used to implement particular operations. In some embodiments coprocessor 1080 may implement particular operations more efficiently than a general-purpose processor. In various embodiments, coprocessors 1080 include optimizations and/or specialized hardware not typically implemented by core processors in compute complex 1020. In an embodiment, coprocessor 1080 implements vector and matrix operations.

Display unit 1065 may be configured to read data from a frame buffer and provide a stream of pixel values for display. Display unit 1065 may be configured as a display pipeline in some embodiments. Additionally, display unit 1065 may be configured to blend multiple frames to produce an output frame. Further, display unit 1065 may include one or more interfaces (e.g., MIPI® or embedded display port (eDP)) for coupling to a user display (e.g., a touchscreen or an external display).

I/O bridge 1050 may include various elements configured to implement: universal serial bus (USB) communications, security, audio, and low-power always-on functionality, for example. I/O bridge 1050 may also include interfaces such as pulse-width modulation (PWM), general-purpose input/output (GPIO), serial peripheral interface (SPI), and inter-integrated circuit (I2C), for example. Various types of peripherals and devices may be coupled to device 1000 via I/O bridge 1050.

In some embodiments, device 1000 includes network interface circuitry (not explicitly shown), which may be connected to fabric 1010 or I/O bridge 1050. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 1000 with connectivity to various types of other devices and networks.

Example Applications

Figure 11:
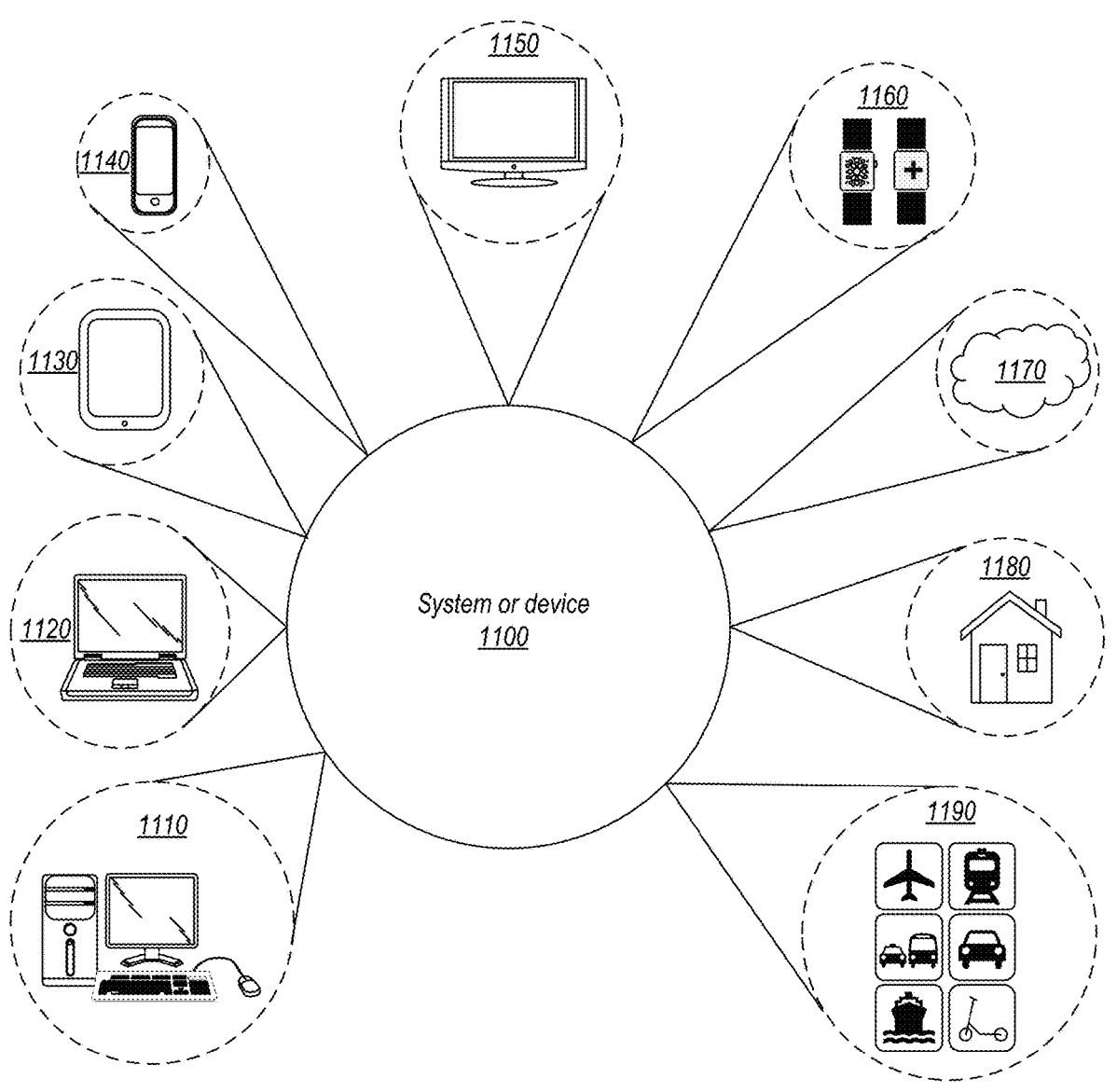
FIG. 11 is a block diagram illustrating an example computing device that is usable in various types of systems, according to some embodiments.

Turning now to FIG. 11, various types of systems that may include any of the circuits, devices, or system discussed above. System or device 1100, which may incorporate or otherwise utilize one or more of the techniques described herein, may be utilized in a wide range of areas. For example, system or device 1100 may be utilized as part of the hardware of systems such as a desktop computer 1110, laptop computer 1120, tablet computer 1130, cellular or mobile phone 1140, or television 1150 (or set-top box coupled to a television).

Similarly, disclosed elements may be utilized in a wearable device 1160, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1100 may also be used in various other contexts. For example, system or device 1100 may be utilized in the context of a server computer system, such as a dedicated server or on shared hardware that implements a cloud-based service 1170. Still further, system or device 1100 may be implemented in a wide range of specialized everyday devices, including devices 1180 commonly found in the home such as refrigerators, thermostats, security cameras, etc. The interconnection of such devices is often referred to as the "Internet of Things" (IoT). Elements may also be implemented in various modes of transportation. For example, system or device 1100 could be employed in the control systems, guidance systems, entertainment systems, etc. of various types of vehicles 1190.

The applications illustrated in FIG. 11 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 12:
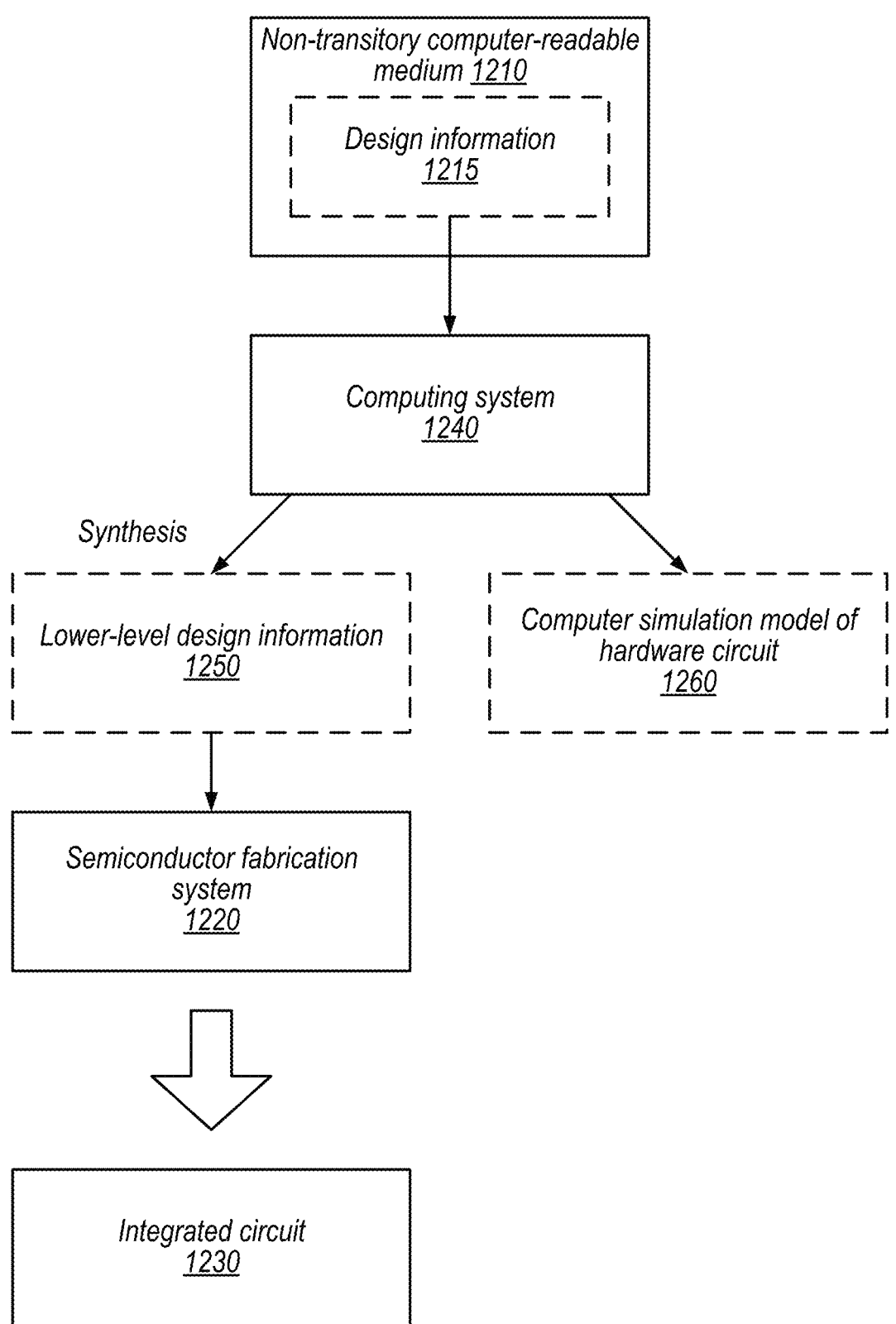
FIG. 12 is a block diagram illustrating a computer-readable storage medium storing circuit design information for a computing device, according to some embodiments.

FIG. 12 is a block diagram illustrating an example non-transitory computer-readable storage medium that stores circuit design information, according to some embodiments. In the illustrated embodiment, computing system 1240 is configured to process the design information. This may include executing instructions included in the design information, interpreting instructions included in the design information, compiling, transforming, or otherwise updating the design information, etc. Therefore, the design information controls computing system 1240 (e.g., by programming computing system 1240) to perform various operations discussed below, in some embodiments.

In the illustrated example, computing system 1240 processes the design information to generate both a computer simulation model 1260 of a hardware circuit and lower-level design information 1250. In other embodiments, computing system 1240 may generate only one of these outputs, may generate other outputs based on the design information, or both. Regarding the computing simulation, computing system 1240 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1240 also processes the design information to generate lower-level design information 1250 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1250 (potentially among other inputs), semiconductor fabrication system 1220 is configured to fabricate an integrated circuit 1230 (which may correspond to functionality of the simulation model 1260). Note that computing system 1240 may generate different simulation models based on design information at various levels of description, including information 1250, 1215, and so on. The data representing design information 1250 and model 1260 may be stored on medium 1210 or on one or more other media.

In some embodiments, the lower-level design information 1250 controls (e.g., programs) the semiconductor fabrication system 1220 to fabricate the integrated circuit 1230. Thus, when processed by the fabrication system, the design information may program the fabrication system to fabricate a circuit that includes various circuitry disclosed herein.

Non-transitory computer-readable storage medium 1210, may comprise any of various appropriate types of memory devices or storage devices. Non-transitory computer-readable storage medium 1210 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1210 may include other types of non-transitory memory as well or combinations thereof. Accordingly, non-transitory computer-readable storage medium 1210 may include two or more memory media;

such media may reside in different locations—for example, in different computer systems that are connected over a network.

Design information 1215 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 1240, semiconductor fabrication system 1220, or both. In some embodiments, design information may also include one or more cell libraries that specify the synthesis, layout, or both of integrated circuit 1230. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1230 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1220 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1220 may also be configured to perform various testing of fabricated circuits for correct operation.

In various embodiments, integrated circuit 1230 and model 1260 are configured to operate according to a circuit design specified by design information 1215, which may include performing any of the functionality described herein. For example, integrated circuit 1230 may include any of various elements shown in FIGS. 1-6. Further, integrated circuit 1230 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1220 to fabricate integrated circuit 1230.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation-

[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail.

Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
a random-access storage element array configured to store, in a set of entries of the storage element array, a set of input data to an operation, wherein entries within the set of entries are to be allocated among one or more execution lanes; and
a permute network connected to each entry of the set of entries, wherein the permute network is configured to select from among the set of entries to provide operands to one or more source inputs of execution circuitry configured to perform the operation; and
for a given source input in a given execution lane of the one or more execution lanes, the permute network is configured to provide connection to only a subset of a group of entries that are to be allocated to the given execution lane, wherein the subset of the group of entries includes fewer than all of the entries in the group of entries.

2. The apparatus of claim 1, wherein:
the storage element array does not include a read port accessing the group of entries that are to be allocated to the given execution lane; and
the permute network does not include a read port accessing the group of entries that are to be allocated to the given execution lane.

3. The apparatus of claim 1, wherein the permute network is configured to support multiple modes of the operation.

4. The apparatus of claim 3, wherein:
the permute network includes one or more stages; and
at least one of the one or more stages is a mode-balanced stage configured to reduce, for each of the multiple modes, a number of connections extending beyond the mode-balanced stage and toward the one or more source inputs.

5. The apparatus of claim 1, wherein:
the set of input data includes values of elements of a matrix; and
the operation is a matrix multiplication operation.

6. The apparatus of claim 3, wherein:
the set of input data includes values of elements of a matrix;
the operation is a matrix multiplication operation; and
the multiple modes of the operation include multiplication of the matrix as stored in the set of entries and multiplication of a transpose of the matrix.

7. The apparatus of claim 1, wherein the storage element array is implemented as at least a portion of a cache memory.

8. A method, comprising:
storing, by a processor and into a set of entries of a storage array of the processor, a set of input data to an operation, wherein entries within the set of entries is are to be allocated among one or more execution lanes; and
connecting, by a permute network of the processor, to each entry of the set of entries and to one or more source inputs of execution circuitry configured to perform the operation, wherein the connecting includes providing, for a given source input in a given execution lane of the one or more execution lanes, connection to only a subset of a group of entries that are to be allocated to the given execution lane, wherein the subset of the group of entries includes fewer than all of the entries in the group of entries.

9. The method of claim 8, wherein the connecting includes supporting multiple modes of the operation.

10. The method of claim 9, wherein:
the permute network includes one or more stages; and
the connecting includes, for at least one mode-balanced stage of the one or more stages, reducing, for each of the multiple modes, a number of connections extending beyond the mode-balanced stage and toward the one or more source inputs.

11. The method of claim 8, wherein:
the set of input data includes values of elements of a matrix; and
the operation is a matrix multiplication operation.

12. The method of claim 9, wherein:
the set of input data includes values of elements of a matrix;
the operation is a matrix multiplication operation; and
the multiple modes of the operation include multiplication of the matrix as stored in the set of entries and multiplication of a transpose of the matrix.

13. The method of claim 8, wherein the connecting does not include using a read port.

14. The method of claim 11, wherein storing the set of input data comprises storing the values of elements of the matrix in a sequence such that entries storing elements along a first row, or column, of the matrix are followed in the sequence by entries storing elements along a second row, or column, of the matrix, continuing in the same manner until an entirety of the matrix is stored.

15. A non-transitory computer readable medium having stored thereon design information that specifies, in a format recognized by a fabrication system that is configured to use the design information to produce a hardware integrated circuit, at least a portion of a design of an operand selection circuit, the operand selection circuit comprising:
a random-access storage element array configured to store, in a set of entries of the storage element array, a set of input data to an operation, wherein entries within the set of entries is are to be allocated among one or more execution lanes; and
a permute network connected to each entry of the set of entries, wherein the permute network is configured to select from among the set of entries to provide operands to one or more source inputs of execution circuitry configured to perform the operation; and
for a given source input in a given execution lane of the one or more execution lanes, the permute network is configured to provide connection to only a subset of a group of entries that are to be allocated to the given execution lane, wherein the subset of the group of entries includes fewer than all of the entries in the group of entries.

16. The computer readable medium of claim 15, wherein the design information further specifies at least a portion of a design of the execution circuitry configured to perform the operation.

17. The computer readable medium of claim 15, wherein the design information further specifies at least a portion of a design of a computing device including the operand selection circuit.

18. The computer readable medium of claim 17, wherein the computing device is a graphics processing device.

19. The computer readable medium of claim 15, wherein:
the storage element array does not include a read port accessing the group of entries that are to be allocated to the given execution lane; and
the permute network does not include a read port accessing the group of entries that are to be allocated to the given execution lane.

20. The computer readable medium of claim 15, wherein the permute network is configured to support multiple modes of the operation.

\* \* \* \* \*